April 13, 1954  C. N. WYNKOOP  2,675,025
FLEXIBLE CURTAIN TYPE VALVE
Filed June 7, 1951  2 Sheets-Sheet 1
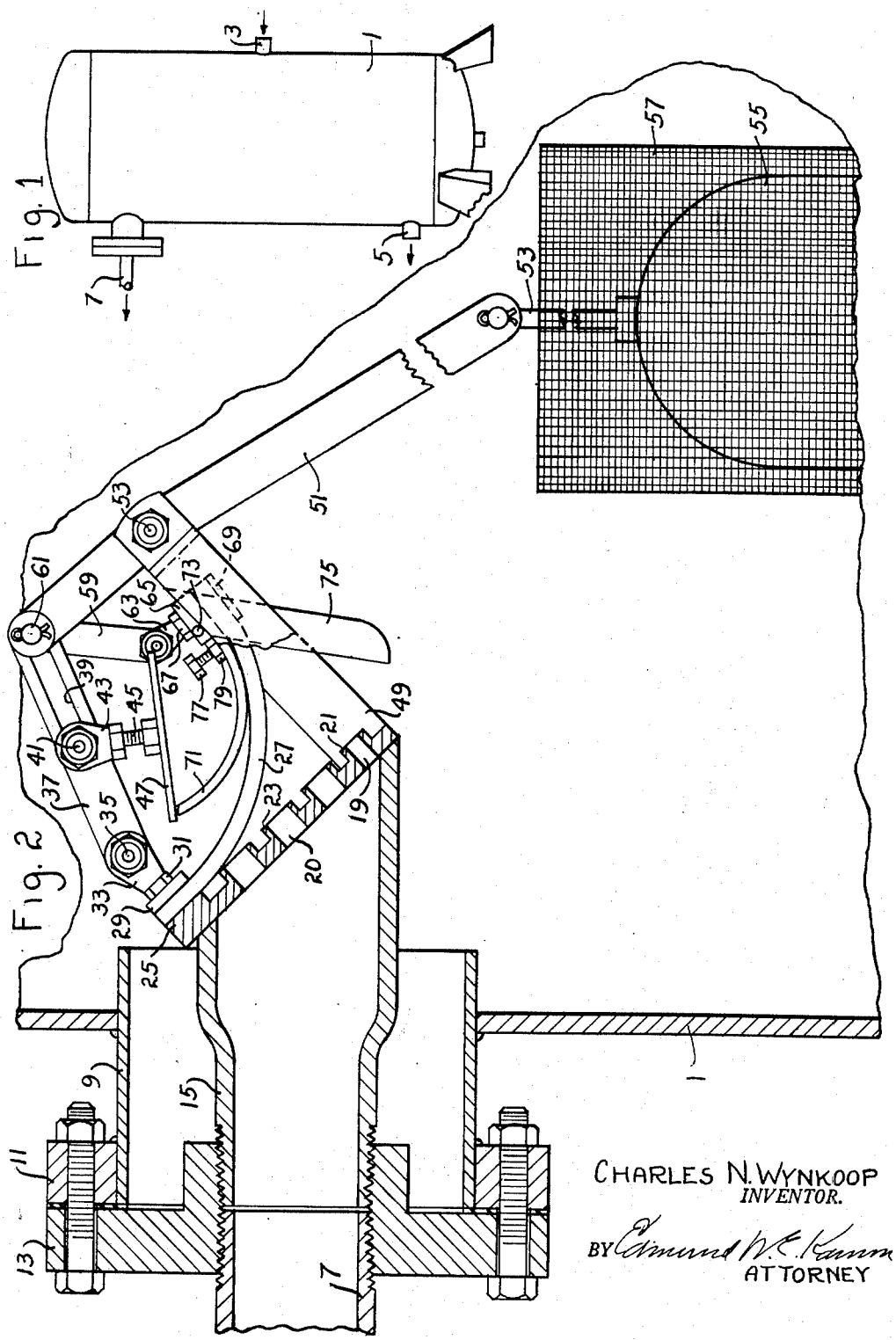
CHARLES N. WYNKOOP
INVENTOR.
BY Edmund W. E. Kamm
ATTORNEY

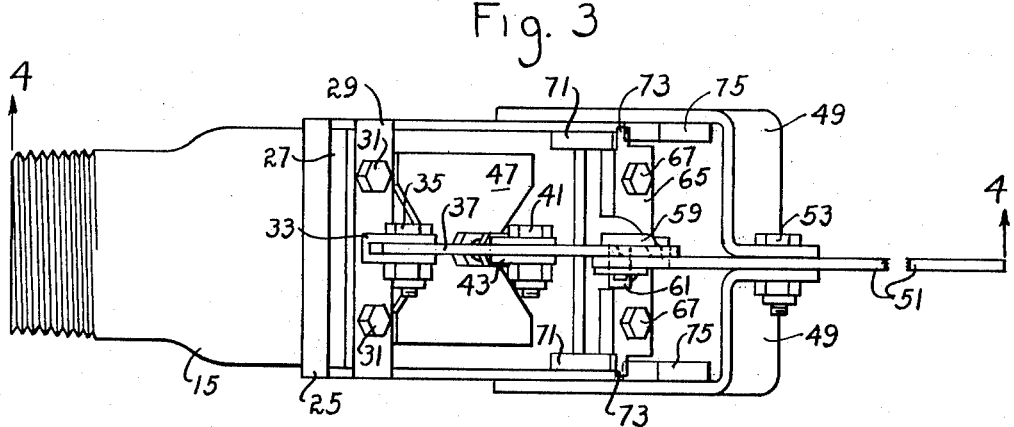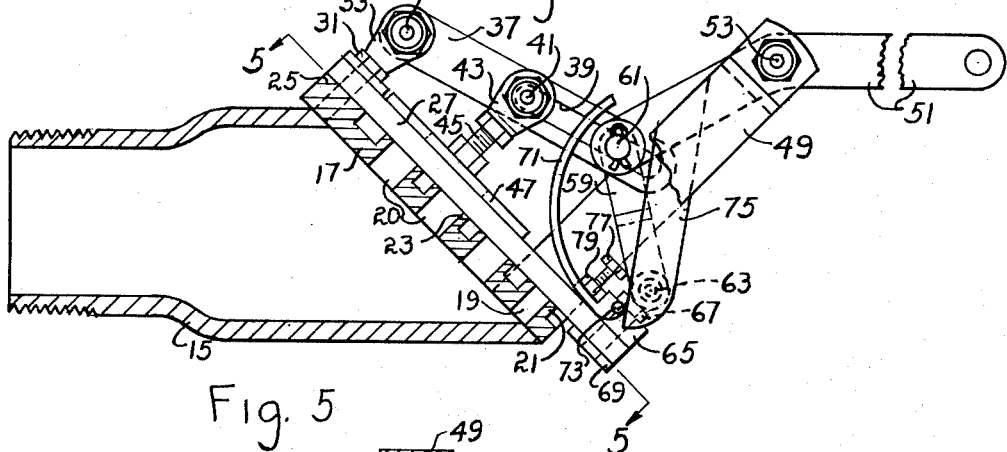

Patented Apr. 13, 1954

2,675,025

UNITED STATES PATENT OFFICE 2,675,025

FLEXIBLE CURTAIN TYPE VALVE

Charles N. Wynkoop, Tulsa, Okla., assignor to Bowser, Inc., Fort Wayne, Ind., a corporation of Indiana Application June 7, 1951, Serial No. 230,356

12 Claims. (Cl. 137—625.12)

This invention relates to a flexible valve, commonly termed a "peel off" valve similar to that shown in the patent issued to Carlos E. Crawford, No. 2,216,000 on September 24, 1940, for Automatic Pipe Line Delivery Valve.

Prior designs of this type of valve have not been too successful because it is difficult to secure the action which will insure that the ports will be opened seriatim in which case the force applied by the float is insufficient to open the valve. In the case of the patent referred to, the float is unguided and consequently is tossed about by the currents in the liquid so that it and the valve are subject to damage.

It is an object of the invention to provide means for guiding and restraining the movement of the float to a predetermined path which prevents damage to it and to the valve.

It is a further object of the invention to provide a structure which will insure that the valve ports will progressively be opened or closed until full opening or closing is achieved, if it is required.

These and other objects will become apparent from a study of this specification and the drawings which are attached hereto, made a part hereof and in which:

Figure 1 is an exterior elevation of a gas separator in which the valve is employed.

Figure 2 is an enlarged sectional elevation showing the valve and its operating float mounted in the separator, the valve being shown open.

Figure 3 is a plan view of the valve mechanism with the valve closed.

Figure 4 is a sectional view taken substantially on the line 4—4 of Figure 3.

Figure 5 is a sectional view taken substantially on the line 5—5 of Figure 4 showing the ports and port plate.

Referring particularly to Figure 1, the numeral 1 indicates a gas separator tank having an inlet 3, a liquid outlet 5 and a gas outlet 7. The valve is shown in Figure 2 as being applied to the gas outlet although it may be used to control liquids as well as gases.

The tank gas outlet comprises a relatively large nipple 9 which is welded in the tank and is provided with a flange 11, a second flange 13 which is in the nature of a reducing flange threadedly receives the gas outlet pipe 7 and the valve body 15.

The inner end of the body is preferably expanded in diameter and is cut off at an angle, here shown to be approximately 45 degrees. A port plate 17 is attached to the inner end of the body in any suitable manner. This plate comprises a plurality of ports 19, 20 which are defined by tubular nipples 21, 23 preferably distributed in the pattern shown in Figure 5. The nipples 21 are of smaller diameter than nipples 23 so that the force holding the valve on these nipples will be reduced.

A pad 25 is formed across the upper end of the plate and the valve 27 which is made of a synthetic rubber or other suitable, flexible material is anchored to the pad by means of strip 29 and cap screws 31.

A clevis 33 is also mounted in the pad and supports, by means of the bolt 35 a lever 37 which has its free end slotted at 39. A bolt 41 which is adjustably mounted in the slot at one end carries a clevis 43 which supports a stud 45 which in turn carries a presser plate 47 which is adapted to ride on the valve 27.

Extending upwardly from adjacent the lower end of the port plate, and substantially perpendicular thereto, is a two-piece yoke 49 which, at its upper end embraces a bent lever 51 which is pivotally mounted on the bolt 53 supported by the yoke.

The outer end of the lever 51 has pivotally connected to it the depending float rod 53 which supports at its lower end the float 55 which is preferably housed in a tubular screen member 57 to prevent it being thrown about and damaged by the liquid currents in the tank.

The inner or short end of the lever is pivotally connected to the upper end of a link 59 by a pin 61 which passes through the slot 39. The lower end of the link is pivotally connected to a clevis 63 which is fixed to the bar 65 which is, in turn, bolted to the lower end of the valve by cap screws 67 which enter a lower plate 69.

A pair of curved fingers 71 extend from bar 65 at a point in contact with the valve and curve upwardly away from the valve when the latter is seated. A pair of projections 73 extend axially from the bar 65 and engage guides 75 which are fixed to the inner faces of the yoke 49 and extend at a downwardly diverging angle therewith. The guides engage the ends of the bar 65 to prevent lateral displacement of the valve and they engage the projections 73 to compress the valve slightly in a longitudinal direction as it moves from the Figure 4 to the Figure 2 position.

A stop 77 is screwed into the bar 65 and a jam nut 79 holds the adjustment of the stop which contacts the lower side of link 59 to limit the counterclockwise rotation of lever 51 as shown in Figure 4.

Operation

Assuming that the valve is closed as shown in Figure 4 and that the liquid level in the tank is dropping due to an accumulation of gas. The float will follow the liquid level down and this raises link 59 and lever 37. The latter lifts the presser plate 47 from the valve while the former pulls on the bar 65 in a direction such as would tend to double the valve back upon itself.

Since the pressure in the tank serves to hold the valve down on the seat, this "doubling" action is opposed thereby. The curved fingers 71 translate the "doubling" action into a lifting action which tends to "peel" the valve from the first port 21. The opening of the first port decreases somewhat the differential pressure which holds the valve on the seat.

Further dropping of the float increases the amount by which the valve is lifted and it is peeled from additional ports to the degree necessary to discharge the gas and stop the falling of the liquid level.

The ends of bar 65 riding against the inner sides of guides 75 limits lateral displacement of the end of the valve while the engagement of the projection 73 with the lower surfaces of the guides tends to compress the valve endwise to a slight degree and prevent any longitudinal stretching of the valve which might result from the forces applied to it during opening.

As the gas is vented, the liquid level will rise and the float, following the liquid, will close the valve. As the valve reaches the Figure 4 position, the presser plate is applied to force the vave to seat on the nipples to insure against leakage and finally the link 59 strikes the stop 77 and positively prevents further rising of the float or closing operation of the valve.

It is obvious that various changes may be made in the form, structure and arrangement of parts without departing from the spirit of the invention. Accordingly, applicant does not desire to be limited to the specific embodiment disclosed herein which is primarily for purposes of illustration; but instead, he desired protection falling fairly within the scope of the appended claims.

What I claim to be new and desire to protect by Letters Patent of the United States is:

1. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, and means for connecting said free end of the valve to the link.

2. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, a presser plate pivotally connected to said first lever, disposed above the valve and adapted to press said valve toward said seat, an operating lever pivotally mounted adjacent the free end of said valve and extending toward the first lever, a link connected by pivotal means to said operating lever, said pivotal means extending through the slot in said first lever, and means for connecting said free end of the valve to the link.

3. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, means for connecting said free end of the valve to the link comprising a bar connected to the free end of the valve and extending transversely thereof, and a pair of arms fixed to said bar in contact with said valve and curving away from said valve at the point of contact.

4. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, means for connecting said free end of the valve to the link comprising a bar connected to the free end of the valve and extending transversely thereof, and a pair of arms fixed to said bar in contact with said valve and curving away from said valve at the point of contact, a pair of guides, one disposed adjacent each end of the bar, to confine the bar therebetween.

5. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, means for connecting said free end of the valve to the link comprising a bar connected to the free end of the valve and extending transversely thereof, and a pair of arms fixed to said bar in contact with said valve and curving away from said valve at the point of contact, a pair of guides, one disposed adjacent each end of the bar, to confine the bar therebetween, a projection disposed at each end of said bar to ride on the guides to determine the path taken by the free end of said valve as the latter opens and closes.

6. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, pivotal means for connecting said free end of the valve to the link comprising a bar connected to the free end of the valve and extending transversely thereof, a stop on said bar disposed in the path of said link for limiting the pivotal motion of said link.

7. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, said levers serving to exert a pull on the link in one direction of their motion, pivotal means for connecting said free end of the valve to the link comprising a bar connected to the free end of the valve, said link being disposed to pull said valve in a direction to double the valve backwardly upon itself, and means on the bar for lifting the valve away from the seat as said link is pulled.

8. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, said levers serving to exert a pull on the link in one direction of their motion, pivotal means for connecting said free end of the valve to the link comprising a bar connected to the free end of the valve, said link being disposed to pull said valve in a direction to double the valve backwardly upon itself, means on the bar for lifting the valve away from the seat as said link is pulled away, and means on said body and said free end of the valve for confining the movement of said free end to a predetermined path.

9. In a valve, a body having a seat provided with a plurality of parts, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, said levers serving to exert a pull on the link in one direction of their motion, pivotal means for connecting said free end of the valve to the link comprising a bar connected to the free end of the valve, said link being disposed to pull said valve in a direction to double the valve backwardly upon itself, means on the bar for lifting the valve away from the seat as said link is pulled away, and means on said body and said free end of the valve for confining the movement of said free end to a predetermined rectilinear path.

10. In a valve, a body having a seat provided with a plurality of ports, a flexible valve having one end free and one end fixed to the body at one end of the seat and movable toward and from the ports to close and open them, and means for moving said valve, the improvement in said moving means which comprises a first lever pivotally mounted on the body adjacent the fixed end of the valve, and having a free end slotted, an operating lever pivotally mounted adjacent the free end of said valve and extending toward the first lever, a link connected by pivotal means to said operating lever, said pivotal means extending through the slot in said first lever, said levers serving to exert a pull on the link in one direction of their motion, pivotal means for connecting said free end of the valve to the link comprising a bar connected to the free end of the valve, said link being disposed to pull said valve in a direction to double the valve backwardly upon itself, and means on the bar for lifting the valve away from the seat as said link is pulled, and means on said bar disposed in the path of said link as it moves in a valve closing direction to limit the travel of said link after the valve has been closed.

11. In a valve, a body having a seat provided with a plurality of ports, a flexible valve having one end free and one end fixed to the body at one end of the seat and movable toward and away from the ports to close and open them, and means for moving the valve, the improvement in said moving means which comprises a toggle mechanism comprising two independently pivoted levers, one being an operating lever and having a pin, disposed in a slot in the other lever, a link connected at one end to the pin, means connecting the other end of said link to the free end of said valve, said link forming an acute angle with the valve when the valve is closed so as to apply a force in a direction to double the valve back upon itself when the operating lever is moved to open the valve.

12. In a valve, a body having a seat provided with a plurality of ports, a flexible valve having one end free and one end fixed to the body at one end of the seat and movable toward and away from the ports to close and open them, and means for moving the valve, the improvement in said moving means which comprises a toggle mechanism comprising two independently pivoted levers, one being an operating lever and having a pin, disposed in a slot in the other lever, a link connected at one end to the pin, means connecting the other end of said link to the free end of said valve, said link forming an acute angle with the valve when the valve is closed so as to apply a force in a direction to double the valve back upon itself when the operating lever is moved to open the valve, a pair of curved fulcrum arms, one disposed at each side of the valve and connected to the free end thereof, said arms being disposed for contact with the side of the valve which is away from the ports and curving away from the valve to convert the pull of the link into motion of the valve in a direction away from the ports.

References Cited in the file of this patent

UNITED STATES PATENTS

| Number | Name | Date |
|---|---|---|
| 639,218 | Dempster | Dec. 19, 1899 |
| 836,604 | Pinkerton | Nov. 20, 1906 |
| 874,523 | Meagher | Dec. 24, 1907 |
| 2,216,000 | Crawford | Sept. 24, 1940 |